United States Patent Office 2,963,483
Patented Dec. 6, 1960

2,963,483
N-GLYCIDYLPIPERAZINE AND METHOD OF MAKING IT

Donald L. Heywood, Charleston, W. Va., assignor to Union Carbide Corporation, a corporation of New York No Drawing. Filed Dec. 22, 1958, Ser. No. 781,947

1 Claim. (Cl. 260—268)

The present invention relates to a novel composition of matter, and to a method of producing the same. More particularly, this invention is directed to N-glycidylpiperazine as a new epoxy monomer particularly adapted for use in the manufacture of water-soluble homopolymers useful in a variety of applications including coagulation of sewage sludge, a coagulant for coal slurry, clay and as thickening agents.

The compound of the present invention can be represented by the following structural formula:

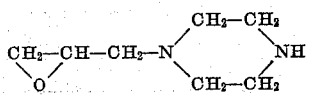

N-glycidylpiperazine is readily prepared by the reaction of equimolar quantities of epichlorhydrin and piperazine followed by dehydrohalogenation with a base.

The reaction mechanism whereby the compound of the invention is produced can be illustrated by the following equations:

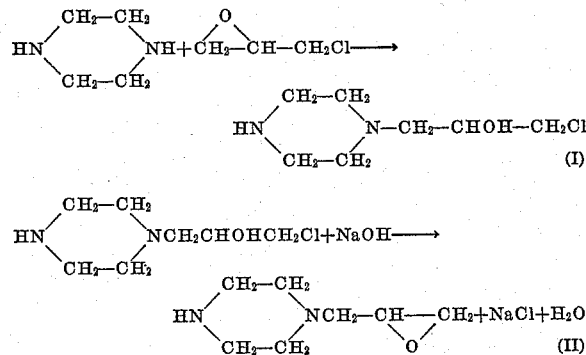

The product of the reaction illustrated in Equation I can be isolated if desired but it is more convenient to treat the reaction mixture directly with a base such as sodium hydroxide, potassium hydroxide, sodium and potassium alkoxides, calcium hydroxide and amine bases dissolved in a suitable solvent such as ethanol, methanol, ketones, esters, benzene, dioxane and the like to produce the desired N-glycidylpiperazine, as illustrated above.

The temperature at which the process of the invention is carried out is not necessarily a critical feature of the invention and can be varied over a wide range. It is preferred, however, to conduct the reaction with epichlorhydrin and the dehydrohalogenation step at a temperature in the range of from 0° C. to 50° C.

The salt formed in the dehydrohalogenation step can be readily removed by any means such as filtration, centrifugation and the like. The product, N-glycidylpiperazine, can then be recovered by removal of solvent, preferably at reduced pressures, or by precipitation with a non-solvent therefor or a combination of these techniques.

The following examples will serve to illustrate the practice of the invention and the utility thereof:

EXAMPLE 1

*Preparation of N-glycidylpiperazine hydrate*

One mol of epichlorhydrin was added over a period of one hour to one mol of piperazine in 200 grams of ethanol which contained 2 grams of water, while the temperature of the reaction was maintained below about 25° C. with ice cooling. After a 15 minute reaction period, one mol of potassium hydroxide dissolved in ethanol was added over a 30 minute period while maintaining the temperature below 25° C. The reaction solution was filtered free of salt and concentrated to one-half volume at reduced pressure. Ethyl acetate was added to the reaction solution to precipitate the product, N-glycidylpiperazine hydrate, which was filtered and dried, and there was obtained 115 grams.

*Physical properties of N-glycidylpiperazine hydrate*

Physical state, 25° C. __ White solid
Melting point _____ The product could not be characterized by melting point because it polymerized Equivalent weight, by titration:
  Theoretical _____ 80
  Found _____ 84

Elemental analysis for $C_7H_{14}ON_2$ ($H_2O$):

|  | Percent Carbon | Percent Nitrogen | Percent Hydrogen |
|---|---|---|---|
| Calculated | 52.47 | 17.49 | 10.07 |
| Found | 52.06 | 17.65 | 8.86 |

The infrared spectrum of the product was compatible with the structure of N-glycidylpiperazine hydrate.

EXAMPLE 2

*Preparation of N-glycidylpiperazine hydrate*

A solution containing 2 mols of piperazine in 300 grams of ethanol containing 3 grams of water was reacted with 2 mols of epichlorhydrin for a period of one hour and 20 minutes, while maintaining the temperature of the reaction between 25° C. and 28° C. Reaction conditions were maintained for an additional one-half hour after the epichlorhydrin had been added, whereupon a solution comprising 2 mols of potassium hydroxide in ethanol was added to the reaction mixture over a period of three-quarters of an hour, while maintaining the temperature specified above. This reaction mixture was then cooled, filtered of salt and the filtrate concentrated to a solid residue comprising 363 grams of product. The product was agitated with ethyl acetate and filtered, providing 291 grams of a white powder which analyzed as N-glycidylpiperazine containing 1.4 mols of water per mol of N-glycidylpiperazine. The yield on this basis was 86 percent.

*Physical properties of N-glycidylpiperazine hydrate*

Physical state, 25° C. __ White powder
Melting point _____ The product could not be characterized by melting point because it polymerized Elemental analysis for $C_7H_{14}ON_2$(1.4 $H_2O$):

|  | Percent Carbon | Percent Hydrogen | Percent Nitrogen | Percent Water |
|---|---|---|---|---|
| Calculated | 50.25 | 10.05 | 16.74 | 15.1 |
| Found | 50.67 | 10.8 | 16.73 | 11.7 (weight loss on vacuum drying) |

EXAMPLE 3

*Preparation of N-glycidylpiperazine*

To 20 grams of piperazine in 35 grams of methanol were added, with stirring, 21.5 grams of epichlorhydrin dropwise over a period of 30 minutes at a temperature in the range of from 25° C. to 30° C. After an additional 30 minutes reaction time had elapsed, 93 grams of a solution of 9.3 grams of sodium hydroxide in methanol were added, with stirring, over a period of 25 minutes. Stirring of the reaction mixture was continued for a period of 2 hours at room temperature, cooled to −8° C. and filtered to remove the salt formed during the reaction. The filtrate was concentrated at reduced pressure to about half-volume at which point an additional small quantity of salt was removed by further filtration. A portion of this filtrate was then concentrated to dryness at reduced pressure and provided 31 grams of a paste-like residue. The residue was agitated with ethyl acetate, cooled to 0° C. and filtered to provide 18 grams of white N-glycidylpiperazine.

EXAMPLE 4

*Polymerization of N-glycidylpiperazine in ethylene glycol*

A suspension was prepared comprising 13 grams of N-glycidylpiperazine in 20 grams of ethylene glycol. The aforesaid mixture was heated with constant stirring on a hot plate. At a temperature of about 120° C., rapid polymerization occurred and provided a light, brown, non-sticky, rubbery material which was further cured by heating in an oven at a temperature of 120° C. for one hour.

EXAMPLE 5

*Polymerization of N-glycidylpiperazine in hexamethylene glycol*

A suspension was prepared comprising 4 grams of N-glycidylpiperazine in 9 grams of hexamethylene glycol. The aforesaid mixture was heated with constant stirring on a hot plate. At a temperature of about 120° C., rapid polymerization occurred and provided a light brown, non-sticky, rubbery material which was further cured by heating in an oven at a temperature of 120° C. for one hour.

EXAMPLE 6

*Polymerization of N-glycidylpiperazine in dimethylformamide*

A solution comprising 20 grams of N-glycidylpiperazine and 80 grams of dimethylformamide was refluxed for a period of 45 minutes, diluted with an additional 300 grams of dimethylformamide and cooled. The product, poly(N-glycidylpiperazine), which deposited, was removed by centrifugation, washed with ethyl acetate and dried, providing 4 grams of a tannish solid characterized by a melting point of from 195° C. to 200° C.

A one percent solution of the aforementioned polymer in water had a reduced viscosity of 2.8.

The above product, poly(N-glycidylpiperazine) is suitable for use in the manufacture of brush handles, combs and the like, as it can be machined and polished to provide a decorative, pleasing effect.

What is claimed is:

As a new composition of matter, N-glycidylpiperazine.

References Cited in the file of this patent

UNITED STATES PATENTS 1,977,253    Stallmann _____ Oct. 16, 1934

OTHER REFERENCES

Gerzon et al.: Journal of Medicinal and Pharmaceutical Chemistry, vol. 1, No. 3, pp. 223–229 (1959).

Abstracts of Papers, American Chemical Society 134th Meeting, pp. 31–0 and 32–0, Sept. 9, 1958.